(12) United States Patent
Monson

(10) Patent No.: US 6,394,435 B1
(45) Date of Patent: May 28, 2002

(54) SHOCK ISOLATOR SYSTEM

(75) Inventor: Robert James Monson, St. Paul, MN (US)

(73) Assignee: Lockheed Martin Corportion, Bethesda, MD (US)

(*) Notice: Subject to any disclaimer, the term of this patent is extended or adjusted under 35 U.S.C. 154(b) by 0 days.

(21) Appl. No.: 09/528,892

(22) Filed: Mar. 20, 2000

(51) Int. Cl.[7] .................................................. F16F 7/00
(52) U.S. Cl. ..................................... 267/141.1; 267/162
(58) Field of Search ................................. 188/379, 380; 267/33, 69, 70, 71, 73, 74, 136, 141, 141.1, 153, 162; 248/619, 620, 621, 632

(56) References Cited

U.S. PATENT DOCUMENTS

| | | | | |
|---|---|---|---|---|
| 1,826,597 A | * | 10/1931 | Brecht | 267/136 |
| 3,466,024 A | * | 9/1969 | Spieth | 267/69 |
| 3,980,016 A | * | 9/1976 | Taylor | 267/162 |
| 4,711,435 A | * | 12/1987 | Harris et al. | 267/221 |
| 5,072,951 A | * | 12/1991 | Hinks | 267/141.4 |
| 5,257,680 A | * | 11/1993 | Corcoran et al. | 188/380 |
| 5,639,074 A | * | 6/1997 | Greenhill et al. | 267/162 |
| 6,079,698 A | * | 6/2000 | Patterson et al. | 267/33 |

* cited by examiner

Primary Examiner—Paul N. Dickson
Assistant Examiner—Thomas J. Williams
(74) Attorney, Agent, or Firm—Pat M. Hogan; Glenn W. Bowen

(57) ABSTRACT

A shock isolator having a spring members such as a belleville washer for supporting a static weight with the belleville washer toggleable between a support condition and a nonsupport condition with the belleville washer having a collapse force that is sufficiently high so that the belleville washer can support a static load without collapsing in order to normally maintain an elastomer damping material in a condition free or substantially free of static forces. When a dynamic force exceeds the collapse force of the belleville washer the belleville washer toggles to a collapsed condition leaving the elastomer to tensionally respond to both the static and the dynamic forces by expansion and contraction of the elastomer. As the elastomer damps the dynamic forces of shock and vibration the forces on the equipment reach a damped condition where the belleville washer expansion force exceeds the forces on the equipment thereby allowing the belleville washer to toggle to the support condition to again provide a static support.

15 Claims, 1 Drawing Sheet

SHOCK ISOLATOR SYSTEM

FIELD OF THE INVENTION

This invention relates generally to shock isolators and, more specifically, to a shock isolator that uses an elastomer damper that remains in a relaxed condition until a dynamic force is applied to the system.

BACKGROUND OF THE INVENTION

In the mounting of sensitive equipment in vehicles such as ships or the like it is often necessary to provide some type of isolator or shock mount to the cabinet of the equipment in order to minimize the chances of the equipment being damaged by shock and vibration forces. Because of there inherent damping characteristics a preferred material for use in isolators are elastomers. However, one of the problems with the use of elastomers in isolators is that some of the elastomer materials creep when subjected to a continuous static force. This makes it difficult to have an elastomer to both support the weight of the cabinet and dynamically respond to the vibration and shock forces. One of the difficulties is as the elastomer reaches a deformed state under the static load the equipment supported thereon is repositioned. In addition, with the equipment in the new position the elastomer dynamic damping response to the vibration and shock forces can change thus altering the effectiveness of the isolator in protecting the equipment from shock and vibration. The present invention provides a compact isolator that includes a belleville washer for normally supporting the entire static weight of the equipment with the belleville washer toggleable from a load support position to a non-support position where both the weight of the equipment and the dynamic forces on the equipment are absorbed by the elastomer to prevent shock and vibration forces from damaging the equipment.

SUMMARY OF THE INVENTION

Briefly, the present invention comprises a shock isolator having a spring member, such as a belleville washer for supporting static weight with the belleville washer toggleable between a support condition and a non-support condition with the belleville washer having a collapse force that is sufficiently high so that the belleville washer can support a static load without collapsing to maintain an elastomer damping material in a condition free or substantially free of static forces. When a dynamic force and the static force exceeds the collapse force of the belleville washer the belleville washer collapses leaving only the elastomer to respond to both the static and the dynamic forces. As the elastomer damps the dynamic forces of shock and vibration, the forces on the equipment eventually reach a level where a belleville expansion force exceeds the combined static and dynamic forces on the equipment causing the belleville washer to toggle back to the load support condition to again support the load in condition where the elastomer is free or substantially free of static forces.

DESCRIPTION OF THE PREFERRED EMBODIMENT

Figure 1:
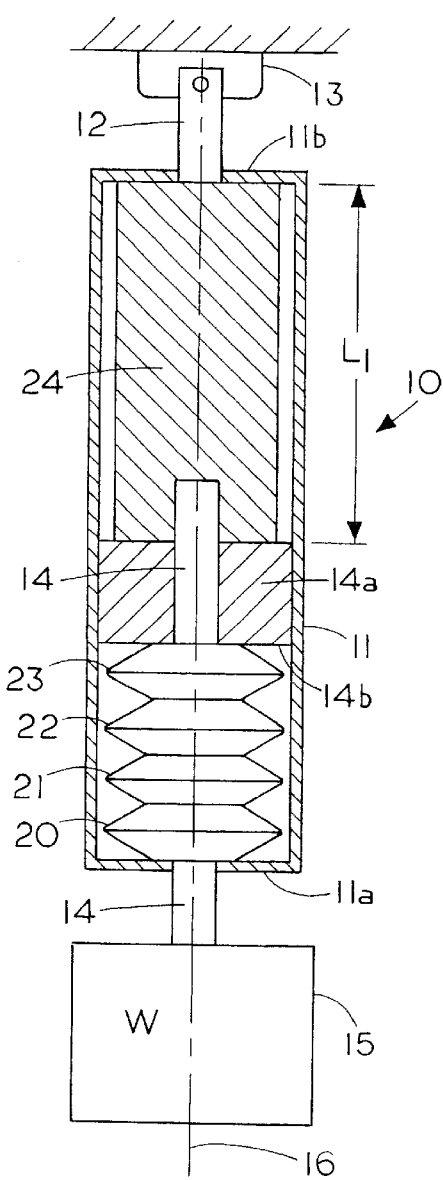
FIG. 1 shows a partly sectional view of isolator of the present invention in the static condition.

FIG. 1 shows a partly sectional view of isolator 10 of the present invention supporting a static weight 15. Isolator 10 includes a cylindrical housing 11 having a lower end 11a and an upper end 11b. Upper end 11b is secured to overhead support 13 though a link 12. Located within housing 11 is an elastomer 24 that has a general cylindrical shape. The top end of elastomer 24 is secured to housing 11b through an adhesive or the like. Secured internally to the lower end of elastomer 24 is one end of a cylindrical support rod 14 that extends through an annular piston 14a and a set of belleville washer 20, 21, 22 and 23, which are in an uncollapsed condition supporting the static weight 15 on the other end of the support rod 14.

Piston 14a, which is secured to connecting rod 14, is slidable within housing 11 along a vertical axis 16 to maintain connecting rod 14 in axial alignment with the central vertical axis 16. The elastomer 24 is shown in a relaxed condition with the length of the elastomer indicated by $L_1$. Typically, elastomer 24 can be any of a variety of natural or commercially available elastomers where it is known the elastomer can creep when subject to continuous static forces.

The belleville washers are known in the art and are usually made of metal with the washer toggleable between a first condition and a second condition in response to a collapse force. Each of the four belleville washer generally comprise a pair of metal conical members each having one end larger than the other with the larger ends secured in engagement with each other. A feature of a belleville washer is that in response to static forces the washers linearly compress until the collapse force is reached. Once the static force exceeds the collapse force the belleville washer abruptly collapses. Once collapsed the belleville washers remain in the collapsed condition until the forces on the belleville washer are less than the inherent expansion force in the belleville washer. Once the forces on the belleville washer are less than the expansion force the belleville washer toggles back to the load support condition where the belleville washers are again in a position to support a static load while maintaining the elastomer 24 in a relaxed or non load bearing condition.

In the embodiment shown the static force generated by weight 15 is compressivley supported by the annular belleville washer 20, 21, 22 and 23 which are vertically stacked around support rod 14. That is the piston 14a has a lower surface 14b that bears against the top of belleville washer 23. The bottom belleville washer 20 is supported by lower housing 11a. With the static weight 15 being supported entirely or substantially entirely by the belleville washers the elastomer 24 can be maintained in a relaxed condition ready to dampingly respond to dynamic forces of vibration and shock. By maintaining the elastomer 24 in a non-load bearing or substantially non-load bearing condition the static weight 15 is supported entirely by the belleville washers, consequently the elastomer 24 remains in a creep-free condition or substantially creep-free condition. Belleville washers 20, 21, 22 and 23 support the weight 15 in a compression mode while the elastomer when activated supports the weight 15 in a tension mode. In the embodiment shown four belleville washers are shown, however, more or less washers can be used in my invention.

Figure 2:
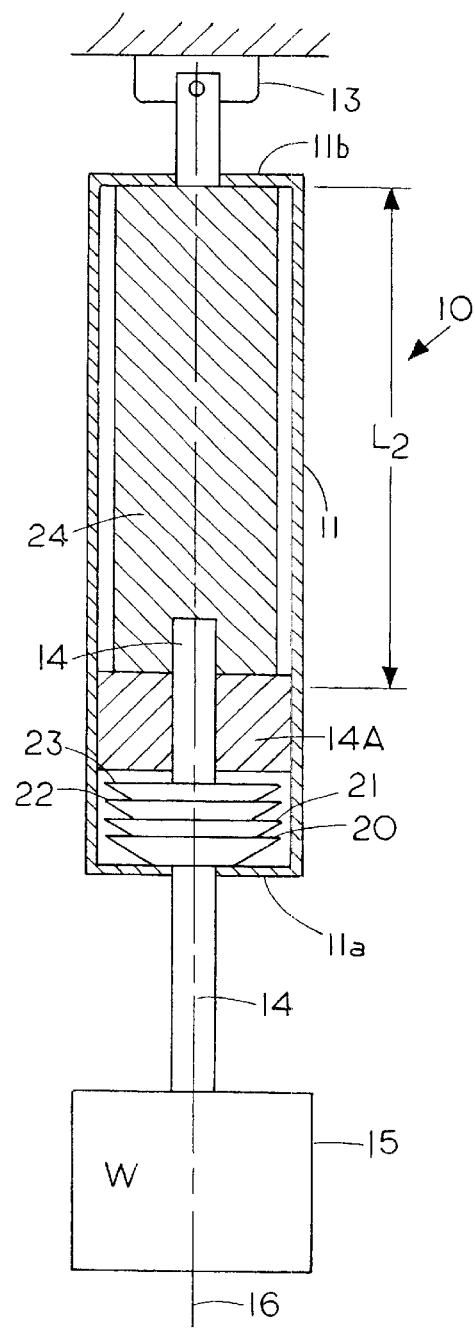
FIG. 2 shows a partly sectional view of isolator of FIG. 1 in a dynamic response condition.

FIG. 2 shows a partly sectional view of isolator 10 of FIG. 1 in an activated or dynamic response condition where the collapse force of the belleville washers 20, 21, 22 and 23 has been exceeded. In this condition each of the belleville washer have toggled from the static support condition to a collapsed or non static support position. That is the weigh 15 is now tensionally supported by elastomer 24, which has been elongated from the length $L_1$ shown in FIG. 1 to the length $L_2$ shown in FIG. 2. In this condition, the elastomer 24 supports both the static forces and the dynamic forces on weight 15. As long as the dynamic forces are of limited duration the elastomer can withstand both the dynamic and static forces while simultaneously damping the dynamic force applied to the weight 15.

Figure 2A:
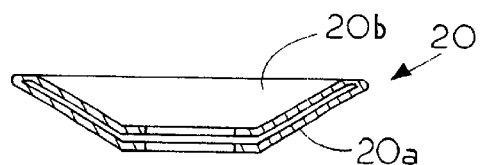
FIG. 2a shows a belleville washer in a toggled condition with a top portion flexed downward into the cavity of lower portion.

FIG. 2a illustrate the toggled condition of belleville washer 20 with top portion 20b flexed downward into the cavity of lower portion 20a.

Figure 3:
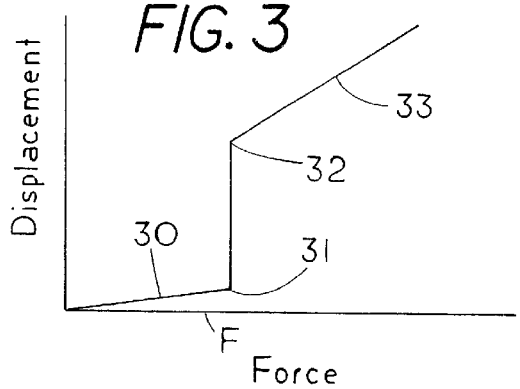
FIG. 3 shows a graph of the force displacement curve for the isolator of FIG. 1.

To illustrate the dynamic response of the isolator 10 reference should be made to FIG. 3 which shows a graph of the displacement of the support rod 14 versus the force F on the support rod 14. Note, as the static force F, which is shown on the horizontal axis, increases the displacement of the support rod 14, which is shown on the vertical axis, increases linearly along line 30. This first phase of displacement is the response of the belleville washer to a static load. That is, the belleville washers compress slightly in response to the static load until the belleville washer reaches a collapse force point indicated by numeral 31. Thus, if the static force F on the support rod 14 is less than the force $F_1$ the belleville washer provides static support to the load on support rod 14. Once collapse force 31 is reached the belleville washer toggles or snaps inward into the contracted condition as shown in FIG. 2. Once the belleville washer toggles to the collapsed condition it no longer provides static support to the load on the support rod. As the displacement of support rod 14 continues to a point 32, the elastomer 24 takes over the response to the forces on the support rod 14. In this condition the elastomer can expand as indicated by line 33, however, more importantly the elastomer can respond to the dynamic forces of shock and vibration to damp the oscillations of weight 15. Once the oscillations of weight 15 are damped the restoring force or expansion force in the belleville washers causes the belleville washers to snap back to the condition shown in FIG. 1. In this condition the belleville washer support the static load and the elastomer is in a non-load bearing condition. As the static load is only temporarily supported by the elastomer the creep effect of an elastomer over an extended period of time is removed from the system allowing the elastomer to damp the dynamic forces of shock and vibration. Once the dynamic forces of shock and vibration are damped the elastomer is effectively removed from the system as a load bearing member since the belleville washer toggles to the support condition shown in FIG. 1 to the condition where the belleville washer compressively supports the weight 15.

Thus the present invention provides a two stage isolator having a belleville washer mounted in housing 11, with the belleville washer having a collapse force. The belleville washer provides a static support for compressively supporting a static force thereon when the static force is less than the collapse force. When the static force and dynamic forces are greater than the collapse force the belleville washer disengages the static support condition. After disengagement from the static support of the washer elastomer 24 located in housing 11 is brought into a dynamic condition for tensionally supporting an object 15 and damping a dynamic force thereon.

In summary, with the present invention a belleville washer normally supports a static force on a support rod so as to maintain the elastomer in a relaxed state until the static force and a dynamic force exceed a collapse force of the belleview washer thereby causing the belleville washer to toggle to a condition of non-support and the elastomer to go from the relaxed state to a state of expansion and contraction to thereby damp the dynamic forces to the shock isolator.

I claim:

1. A shock isolator comprising:

a housing;

an elastomer, said elastomer secured in said housing;

a support rod, said support rod secured to said elastomer; and a spring member, said spring member comprising a belleville washer normally supporting a static force on said support rod so as to maintain the elastomer in a relaxed state until the static force and a dynamic force exceed a collapse force of the belleville washer thereby causing the belleville washer to toggle to a condition of non-support and the elastomer to go from the relaxed state to a state of expansion and contraction to thereby damp the dynamic forces to the shock isolator.

2. The shock isolator of claim 1 including at least two belleville washers.

3. The shock isolator of claim 1 wherein the housing is cylindrical.

4. The shock isolator of claim 1 wherein the support rod includes a piston for sliding within said housing.

5. The shock isolator of claim 1 wherein the elastomer tensionally supports the static load.

6. The shock isolator of claim 1 wherein the belleville washers have a central opening with said support rod extending therethrough.

7. The shock isolator of claim 1 wherein the belleville washer and the elastomer are in axial alignment with said elastomer and said support rod is extendible and contractible along said axis.

8. The shock isolator of claim 1 wherein the housing comprises a closed housing with a bottom for supporting the belleville washers in a compressive mode.

9. The shock isolator of claim 1 wherein the shock isolator is positioned along a vertical axis and the shock isolator supports the static weight of an object connected to the support rod in a compressive mode and the dynamic forces on the object in a tension mode.

10. The method of elastomeric damping comprising:

supporting an object with a spring member having a collapse force and an expansion force with the collapse force larger than a static force of the object;

connecting the object to an elastomer so that in a static position the elastomer is in a non-load bearing condition; and applying a dynamic force to the object until the dynamic force and the static force exceed the collapse force of the spring member to temporally allow the elastomer to carry both the static and the dynamic forces and thereby damp any oscillations of the object.

11. The method of claim 10 wherein the expansion force is made less than the collapse force so that the spring member can expand to a condition whereby the object is supported by the spring member.

12. The method of claim 11 including the step of maintaining the elastomer and the spring member in axial alignment.

13. A two stage shock isolator comprising:

a housing;

a belleville washer mounted in said housing, said belleville washer having a collapse force, said belleville washer providing a static support for compressively supporting a static force thereon when the static force is less than the collapse force, said belleville washer disengaging the static support force when the collapse force is exceeded; and an elastomer located in said housing, said elastomer having a dynamic condition for tensionally supporting an object and damping a dynamic force thereon when the collapse force of the belleville washer is exceeded.

14. The two stage isolator of claim 13 wherein the elastomer and belleville washer are located along a central axis to provide damping along the central axis.

15. The two stage isolator of claim 13 wherein the belleville washer comprise a pair of metal conical members each having one end larger than the other with the larger ends secured in engagement with each other.

* * * * *